7040X
G. Pritchard,
Riding Saddle.
Patented May 3, 1832.
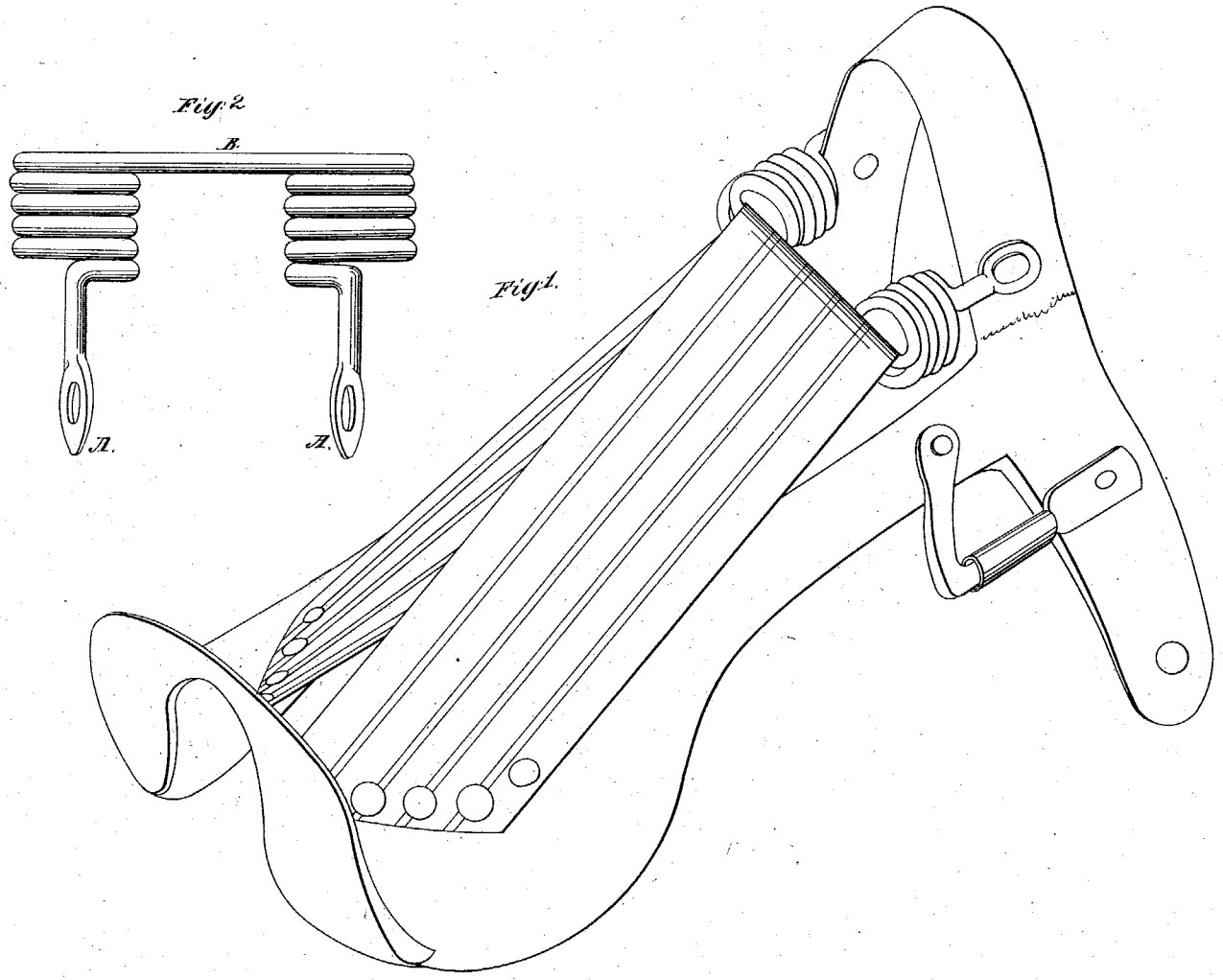
N. PETERS, PHOTO-LITHOGRAPHER, WASHINGTON, D. C.

George Pritchard, of Clarksburg,    Va.
Letters Patent

The schedule referred to in these Letters Patent and making part of the same, containing a description in the words of the said George Pritchard himself of his improvement called the worm steel spring saddle.

---

To all to whom these presents shall come, George Pritchard of Clarksburg, in the County of Harrison, and State of Virginia Gentleman, sends greeting:
Be it known that I the said George Pritchard have invented, constructed, made and applied to use a new and useful improvement in the mode of making & manufacturing saddles, by the application of a steel spring to the seat of the saddle called the worm steel spring viz: This my said improvement in the mode of making & manufacturing saddles (which I claim as my own invention which I believe was never before known or used till I invented the same) consists simply in the making of and applying to use in the seat of the saddle a steel spring made and applied in the manner hereinafter described. The steel should be carefully drawn out to a small rod (or wire) of about one eighth of an inch thick & about five feet in length, it can be drawn out either by a hammer, or a wire plate; they are best to be drawn out with a hammer, as by hammering, the pores of the steel are closed, and the flaws are all worked out, otherwise if drawn out by a wire plate, the pores of the steel are left open, and oftentimes flawy. a space of two or three inches in the middle of the rod should be left somewhat thicker than the other part, for the purpose of receiving the webbing. —
Then form it into a worm by closely wrapping it around a rod of the size of about five eighths of an inch in width and three eighths of an inch in thickness. beginning to wrap at each side of the centre, leaving sufficient room in the centre of the spring to receive the webbing of full width. — —
This spring when wrapped should be be heated to a blood red heat, to prevent it from breaking or cracking while bending. The ends of the spring which go under the cap plate, of the head of the saddle tree, should be made flat & punched for the purpose of rivetting it fast on the head of the tree and left sufficiently strong that when rivetted to the tree it should not break.
The spring when thus made should be properly tempered so as to preserve and drawing made from this [illegible]

7040X retain its elasticity, and prevent it from breaking; it should then be fastened to the tree
by placing the ends of the spring under the cap plate & on the head of the tree & rivet-
ting them strongly together with the flat surface of the spring upwards —
The webbing is fastened to the cantle in the usual manner, and attached to the back
part of the spring (instead of being tacked on the head of the saddle as is the usual
mode) When the webbing is fastened and strained the spring, always has an incli-
nation upwards, keeping the seat always neat and in its proper shape, which gives
a light elastic motion to the rider, and consequently does not come down in that
dead heavy manner of a saddle made in the usual way, wherefore horses are less
liable to injury, by being rode with saddles constructed in this way, than in the
usual way — Saddles made on this plan do not differ in appearance from the
neatest plain or quilted saddles — The advantages that this improvement possess,
over Morris and all others which have come under my notice are, that the tree
is left perfect and whole as in common saddles: thereby being less liable to break
a very prominent objection, to all others that I have ever seen — —
The spring is made elastic because of the length of the worm, more durable on
account of its particular shape and situation, it being placed in that part of the
saddle which preserves and prevents it from being in any way injured or over-
strained, giving the greatest possible ease and comfort to both the rider and horse.
In testimony that the above is a true specification of my said improvement as
above described, I have hereto set my hand this 14th day of March 1832.

Witnesses,
Benjamin Stout
A. Kinnaird

George Pritchard